United States Patent

[11] 3,570,559

[72] Inventor Burtis E. Palmer
Allentown, Pa.
[21] Appl. No. 779,370
[22] Filed Nov. 27, 1968
[45] Patented Mar. 16, 1971
[73] Assignee Western Electric Company, Incorporated
New YORK, N.Y.

[54] METHOD AND APPARATUS FOR THE SPREADING OF COMPONENT LEADS
11 Claims, 8 Drawing Figs.

[52] U.S. Cl. 140/147, 29/203, 72/404
[51] Int. Cl. B21f 1/02
[50] Field of Search 29/203 (P); 140/147; 72/404, 402

[56] References Cited
UNITED STATES PATENTS

| | | | |
|---|---|---|---|
| 3,144,889 | 8/1964 | Cole | 140/147 |
| 3,028,959 | 4/1962 | Clark et al. | 209/81 |
| 3,321,825 | 5/1967 | Cooke | 29/203 |
| 3,404,712 | 10/1968 | Suverkropp | 140/147 |
| 3,071,166 | 1/1963 | Gutbier | 140/147 |
| 3,106,945 | 10/1963 | Wright et al. | 140/147 |
| 3,333,673 | 8/1967 | Zemek | 198/19 |
| 3,122,179 | 2/1964 | Zimmerman et al. | 140/147 |

*Primary Examiner*—Charles W. Lanham
*Assistant Examiner*—Michael J. Keenan
*Attorneys*—H. J. Winegar, R. P. Miller and M. Pfeffer ABSTRACT: A lead spreading technique for electrical components such as transistors having three nominally parallel leads, utilizes a plurality of reciprocable pencillike spreading fingers shaped to fit between and spread adjacent leads. The electrical components are preoriented single file in the conventional manner and are each sequentially located in the operative position by one of the pencil fingers itself. This "locating" finger is mounted upon a three-position cylinder, one position of which injects the finger in an intercepting relationship with one of the component leads as the component file advances. Upon the locating of a component at the operative position, the spreading fingers are reciprocated as closely as possible to the base of the component to separate the leads. Upon full retraction of the locating finger a rubber membrane is employed as an escapement to hold the remaining transistors.

Patented March 16, 1971 3,570,559

2 Sheets-Sheet 1

INVENTOR.
BURTIS EVANS PALMER

BY [signature]

ATTORNEY

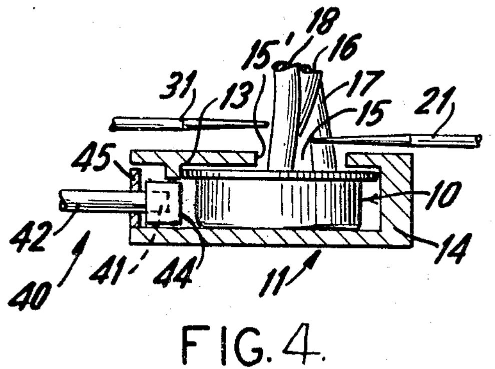
FIG. 4.
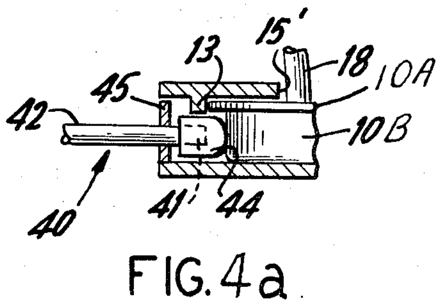
FIG. 4a
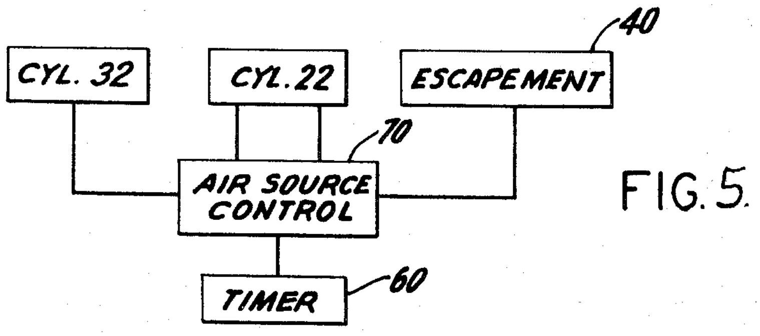
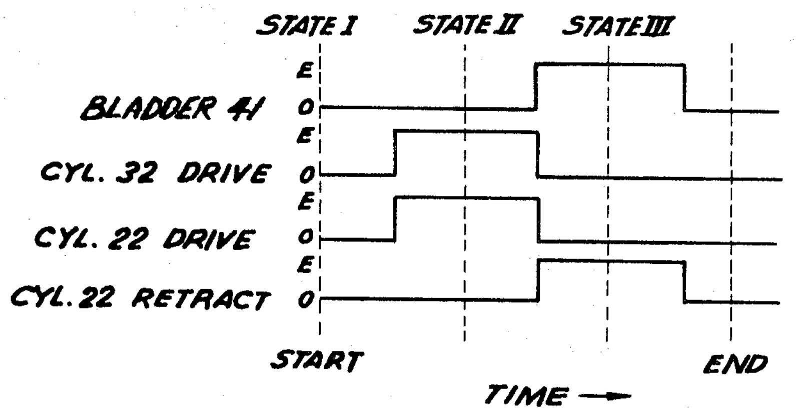
FIG. 6.
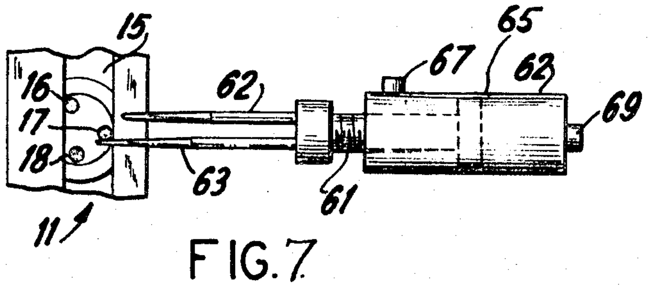
FIG. 7

METHOD AND APPARATUS FOR THE SPREADING OF COMPONENT LEADS

BACKGROUND OF THE INVENTION

This invention relates generally to a method and an apparatus for the spreading of leads emanating in a generally perpendicular attitude from electrical components such as transistors. In particular, the invention relates to components having at least two nominally parallel leads extending from the body of the component in a polygonal array. For the purposes of illustration, the description which follows shall be directed primarily to operations involving conventional three-leaded transistors, where the leads are arranged at the apexes of a right triangle; however, it will be understood that the techniques of the invention may be applied with like import to various different types of components capable of being processed in accordance with this invention.

A typical conventional transistor includes a header on which a semiconductor chip is bonded and having individual leads to which the active portions of the chip are connected with fine wires, and a can welded to the header for encapsulating the transistor. The leads project in substantially the same direction from one face of the header, defining a polygonal array—a right triangle in the case of a standard three-lead transistor. During the manufacture of the transistors, the various processing operations frequently twist and tangle adjacent leads. Since the transistors must be individually tested after fabrication, it is important that the leads be relatively uniformly spread and disentangled from each other prior to testing, so that test probes may make contact with the individual leads. Further, the leads must be appropriately inserted in sockets or printed circuit boards, spread for packaging, and so on. The leads are generally formed of relatively narrow gauge (for example, 17 mil.) nonresilient wires so that efficient separation is not simply obtained.

While numerous solutions have been proposed in the past, all such solutions suffer from one or more drawbacks. Among them are the size, cost, and complexity of the lead separating machines and, in particular, the complexity of the escapement mechanism required for a precise positioning of the component leads in the operative position. Even with sophisticated positioning arrangements, frequent misalignments between the lead spreading apparatus and the component itself often cause structural damage to the component.

OBJECTS OF THE INVENTION

Accordingly, it is the general object of this invention to provide a new and improved method and apparatus for the spreading of the leads of the component type described, particularly, three or more nominally parallel transistor leads arranged in a polygonal array.

It is a further object of this invention to provide an automatic lead spreading apparatus which is simple and inexpensive to install and operate, and which reduces to a minimum possible damage to the transistor leads.

It is a further object of this invention to satisfy the foregoing object with provisions for simply and positively orienting the transistor in position during the spreading process while simultaneously precluding the feeding of more than one transistor at a time.

SUMMARY OF THE INVENTION

The components of the type described are arranged to gravity feed in single file in a generally similarly oriented manner. In the lead spreading location a plurality of lead spreading fingers, each shaped and sized to fit between adjacent leads, are provided. Each finger is mounted on a mechanism adapted to rectilinearly reciprocate the finger across the component face.

In accordance with the invention, at least one of the fingers is mounted such that it is normally disposed in a component-lead-intercepting position with respect to the advancing file of components, preventing further travel of said components and thereby locating and correctly orienting one such component for reciprocation of said spreading fingers. Provision is made for retraction of the "locating" finger free from lead engagement subsequent to the spreading operation, to permit the component to pass to the next processing station or collection bin.

It is a feature of this invention that upon the completion of the spreading operation a bladder member acts as an escapement to intermittently halt the advancing file until the lead intercepting finger may be repositioned to engage the next component lead.

Other objects, advantages, and features of the invention will be apparent by the following detailed description of the specific example and embodiments thereof.

DESCRIPTION OF THE DRAWINGS

FIG. 4 is a horizontal cross section taken along line 2–2 of FIG. 1, showing the relative finger heights and an escapement bladder;

FIG. 4*a* is a detail of FIG. 4 showing the escapement bladder in transistor clamping relationship;

FIG. 5 is a block diagram illustrating the relationship between various energizing means used to drive the mechanisms of the invention;

FIG. 6 is a timing diagram indicating the respective states of operation of the various mechanisms; and FIG. 7 illustrates an alternative embodiment of the invention.

DETAILED DESCRIPTION OF THE INVENTION

Figures 1, 2, 3:
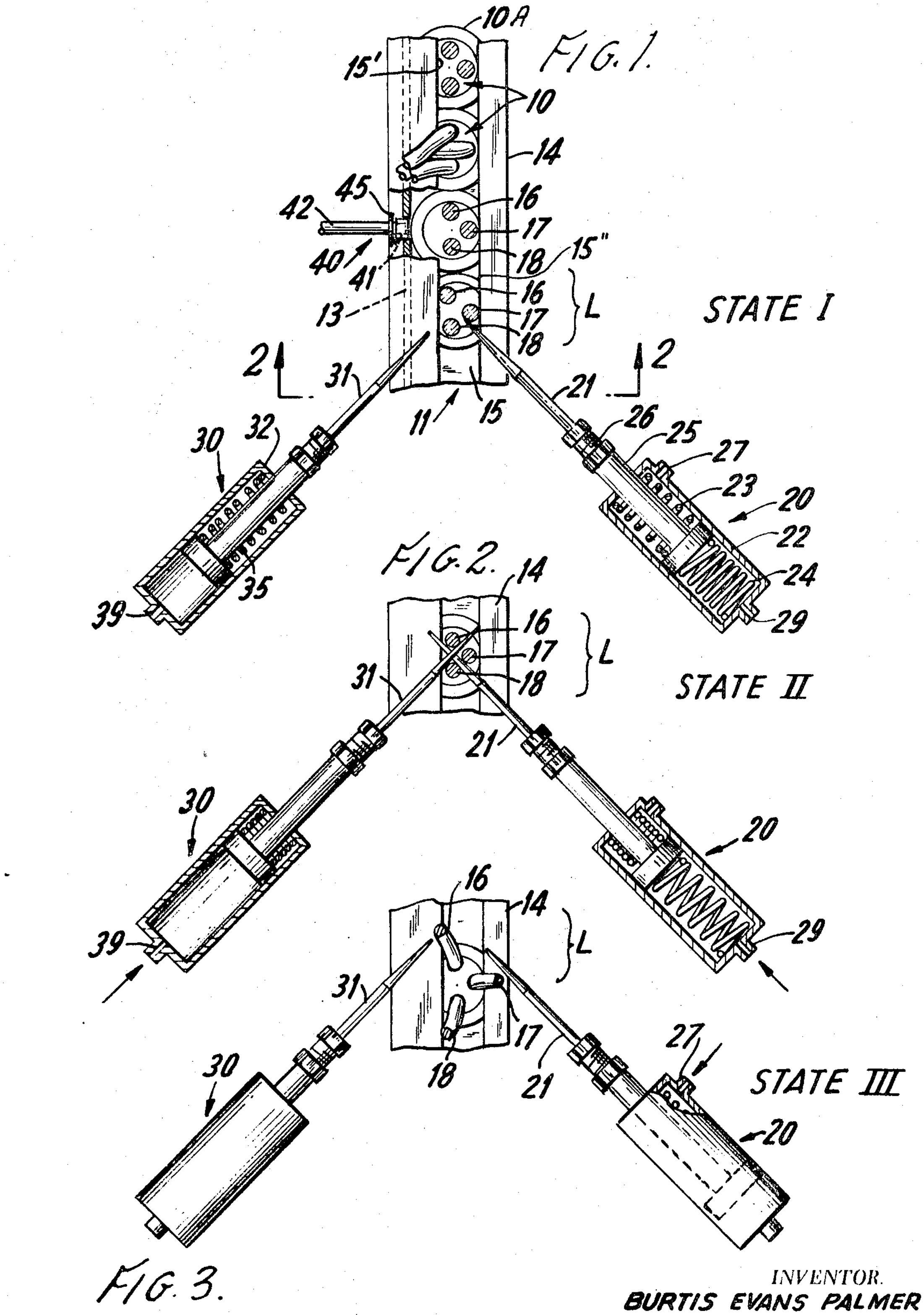
FIG. 1 is a front elevation view of a lead spreader, in accordance with the invention, illustrating a first state of the spreading fingers in a typical operation.
FIG. 2 is a view of the fingers of FIG. 1 in a second state.
FIG. 3 is a view of the fingers of FIG. 1 in a third state.

In the specific embodiment of the invention illustrated, a succession of transistors, designated generally by the numerals 10–10, are fed one at a time from a generally conventional vibratory feeder (not shown) into the upper end of a vertically oriented gravity feed track, designated generally by the numeral 11. Track 11 includes spaced sidewalls 13 and 14 for generally guiding the transistor, and a frontal slot 15 through which transistor leads 16—18 project.

Transistors 10–10 are of the conventional three-lead type and include a flanged header 10–A, from which the leads 16—18 extend and on which the transistor chip (not shown) is bonded and connected to the inner ends of the leads by fine wires. A cylindrical can 10–B is welded to header 10–A around the chip after the wire bonding step to complete the assembly. In the specific example (the common TO–18 package), the leads 16—18 are of gold plated "Kovar" (an alloy of iron, cobalt and nickel) and are about five-eights inches long and 17 mils in diameter. As viewed in FIG. 1, the leads are arranged at the vertices of an imaginary right triangle having two sides of equal length. The distance between lead centers on the perpendicular sides of the imaginary right triangle is approximately one-sixteenth inch.

The transistors are preoriented by conventional means (not shown) in the vibratory hopper so that the hypotenuse of the right triangle is vertical and rides along the left side 15′ of the track slot 15. As may be noted from the FIG., the slot is so dimensioned that the leads of the transistor determine the transistor's orientation during its travel down the track 11. This orientation is retained as the transistors advance towards lead spreading position or location L (sometimes referred to as operating position) delineated by the bracket in FIGS. 1 through 3.

At the lead spreading or operating position L, transistor lead 17 of the first transistor in the file is engaged by a pin or finger 21 which is normally positioned in a lead intercepting relationship by a lead spreading mechanism designated generally by the numeral 20. The lead spreading mechanism 20 includes an air cylinder 22 within which is positioned a piston 25 and a pair of biasing springs 23 and 24 for biasing the piston in opposite directions. The free end of piston 25 has mounted thereon a split collar 26 for permitting replacement of worn fingers. Preferably, the fingers are nonrigid and are made of nylon or flexible steel so that they may "find" the gap between leads without causing lead injury. As shown, the spreading fingers are cylindrical and include tapered end portions for more effectively finding the space between adjacent leads.

Cylinder 22 of spreading mechanism 20 is provided with a pair of air ports 27 and 29 located respectively at opposite ends of the cylinder for moving the piston in opposite directions. More specifically, air pressure applied to port 29 advances the piston 25 and, hence, finger 21 across the face of the transistor. Air applied to port 27, on the other hand, fully retracts the piston 25 to the point where finger 21 is withdrawn from possible contact with the lead 17 of the transistor. With no air supplied to the ports 27 and 29, the springs 23 and 24 bias the piston 25 such that, as shown in FIG. 1, the finger 21 extends partially across the face of a transistor to engage and intercept the lead 17 closest thereto without engaging the other leads 16 and 18.

A spreading mechanism, designated generally by the numeral 30, is generally similar to mechanism 20, just described, however, cylinder 32 and its components define a single acting mechanism having a stable retraction State I (FIG. 1) and an extended spreading state State II (FIG. 2) upon entry of air into port 39.

As shown, the lead spreading mechanisms 20 and 30 are generally orthogonal to one another, thereby being positioned to perpendicularly intersect a line joining the centers of the adjacent leads 16—17 and 17—18. With this disposition of the spreading mechanisms, and with fingers 21 and 31 having diameters equal to or greater than the distance between adjacent leads (and having a flexibility to effectively find the center between leads) each spreading finger will impart a force to adjacent leads urging them 90° to the direction of thrust. Since each lead is effectively engaged by both spreading fingers (see FIG. 2) the net force is the sum of both thrust vectors, i.e., an outward or radial separating force; resulting in the lead configuration shown in FIG. 3.

OPERATION

In operation, with no air supplied to the ports 27 and 29 of the cylinder 22, the first transistor in the descending line will have its outermost lead 17 encountered by finger 21. This encounter will slightly rotate transistor 10 until lead 16 abuts a side 15′ of slot 15. More specifically, as the lead 17 contacts the finger 21 it slides into the bight or pocket formed by the finger and the side 15″. Then, because of the eccentricity of the point of contact with respect to the transistor 10 (i.e., the eccentricity of the lead 17 with respect to the transistor 10), the transistor rotates counterclockwise about the lead 17 until the lead 16 abuts the side 15′. In this manner, the leads are always oriented with respect to the lead spreading mechanisms 20 and 30 in accordance with their skewness, as distinguished from fixed locating systems wherein each transistor is stopped at the same point regardless of the disposition of its leads. As a result, lead spreading in the latter system is not as effective as in the present "position-by-skewness" technique.

An air source control 70 (FIG. 5) is energized via a timer 60, the latter being rendered operative by any conventional position sensing mechanism. As shown in the timing diagram of FIG. 6 (where E designates the energized condition) compressed air is now forced into the drive ports 29 and 39 of cylinders 22 and 32 of the respective finger spreading mechanisms initiating State II. The tapered points of each of the pins now enter between the leads as closely as possible to their roots.

FIG. 4 shows the approximate relative spreading finger heights above the transistor face. As may be seen, the fingers advance in respective planes to permit the simultaneous entry of the pins between the leads. This, of course, is not requisite to the invention, and sequential reciprocation of fingers is also possible.

Upon full extension, air to cylinder 32 is shut off and simultaneously air is forced into the retract port 27 of cylinder 22; State III (FIG. 3) is thereby initiated. By virtue of spring 35, mechanism 30 retracts to the State III position which is a nonintercepting relationship with respect to transistor 10. Simultaneously, finger 21 is fully retracted to also clear the leads. The operated-upon transistor is now free within slot 15 and, by virtue of gravity, drops to the next station where, for example, it may be tested.

In order to prevent the remaining transistors from falling through the operating position, an escapement mechanism, designated generally by the numeral 40, is provided. This mechanism includes a bladder 41 hermetically affixed to an air tube 42 which is coupled to air source control 70. A clamp 45 secures the tube 42 to the track 11. Under normal conditions, the bladder face 44 is flush with the sidewall 13 of the feed track. Under pressure, however, the bladder face 44 distorts and projects beyond the wall (FIG. 4*a*) pressing upon the juxtaposed transistor. Alternatively, bladder 41 may take the form of a rubber piston within tube 42, which travels between an extended clamping position (upon the application of pressure) and a retracted clear position.

As shown in FIG. 6, the escapement bladder 41 is expanded simultaneously with the retraction of finger 21, thereby preventing the remaining transistors from following the free fall of the operated-upon transistor when State III is initiated. When pressure is removed from the cylinders and bladder, the remaining transistors again gravity feed and the first-in-line is again intercepted by finger 21, spreader mechanism 20 having assumed its State I.

It bears mentioning at this point, that the invention is operative without an escapement 40. While the described arrangement is the preferred one, the timing may be so adjusted that finger 21 again assumes the intercepting relationship immediately after the passage of the operated-upon transistor. Finger 21 will thereby be positioned to prevent further advancement of the file.

ALTERNATIVE EMBODIMENT

FIG. 7 shows an alternative embodiment of the invention wherein a single double-acting cylinder 65 is used in place of the two previously described. In this embodiment, the piston 61 of the cylinder 65 has mounted thereon, by any conventional means, a pair of spaced fingers 62 and 63. The lower finger 63 is longer and serves to locate transistor 10 in the operative position, similarly to finger 21 of mechanism 20 in the previously described embodiment. While this embodiment does not give the vectoral lead spreading forces provided by multiple finger thrust of FIG. 1, the device and its controls are greatly simplified. As before, some sort of escapement mechanism (such as the bladder 41) is preferably provided to prevent the free fall of all the transistors in the line upon full retraction of the spreading fingers.

OPERATION

In operation, with no air supplied to ports 67 and 69, the first transistor in the descending line will have its outermost lead encountered by finger 63. This precisely positions the transistor. Air is now fed to port 69 and the spreading is accomplished simultaneously by fingers 62 and 63. Upon travel of the fingers across the transistor face air is fed to port 67 for full retraction, upon which the transistors free fall in the manner described with respect to the previous embodiment.

From FIG. 7, it may be seen that the invention also has application to two lead devices. For example, with lead 17 omitted from the transistor face shown and leads 16 and 18 separated by a distance equivalent to the finger diameter, the finger 63 may be employed to stop the downward progression and finger 62 to cause the spreading. With this arrangement positive positioning is achieved without any possible misalignments between the location device (finger) and the spreading device (juxtaposed finger); moreover, the positioning of this apparatus is simply achieved anywhere along the feed guide.

A related lead spreading technique is disclosed in U.S. Pat. No. 3,520,335 issued to Q. L. Patterson on Jul. 14, 1970.

I claim:

1. In a lead spreading process for electrical components of the type having at least two nominally parallel leads extending from one surface thereof, wherein at least one elongated finger is reciprocated between adjacent leads in a plane substantially parallel to said surface for forcing said leads apart, said components advancing with roughly similar orientation single file along a predetermined path, the improvement for locating said components sequentially at a lead separating position and for spreading the leads at that position, comprising the cyclic steps of:

normally positioning a first elongated finger adjacent said path in a lead intercepting position to prevent the advancement of said components therebeyond, and to place the intercepted component in a desired orientation, thus precisely defining an operating position;

reciprocating at least a second finger across the face of said component to spread said leads; and withdrawing said first finger from said lead intercepting relationship, thereby permitting the operated-upon component to advance beyond said operating position.

2. The method as recited in claim 1, further comprising the step of preventing further advancement of all of said components save the operated-upon component during the withdrawal of said finger.

3. The method as recited in claim 1, wherein the leads extend from the body of said component in a polygonal array, having at least three vertices, and wherein the first and second fingers are disposed in separate planes and are reciprocated simultaneously at a predetermined angle with respect to one another.

4. The method as recited in claim 3, wherein said component is a three-lead transistor having the leads arranged at the vertices of a right triangle; wherein the first and second fingers reciprocate at right angles to one another; and wherein the first finger intercepts the lead located at the apex of said triangle opposite the hypotenuse.

5. The method as recited in claim 3, wherein the positioning of said first finger in a lead intercepting position includes the step of rotating said component to orient it for the lead spreading step.

6. An apparatus for spreading the leads of an electrical component having at least two nominally parallel leads extending from one surface thereof comprising:

means for guiding said components single file along a predetermined advancing path with generally similar orientation;

a plurality of fingers, at least one of which is shaped to fit between adjacent leads and spread them, disposed adjacent said path;

means for normally locating one of said fingers in a component-lead-intercepting position along said path, thereby preventing the advancement of said components beyond this point;

means for reciprocating said fingers across the face of said component, thereby spreading said leads; and means for withdrawing said intercept finger beyond said lead intercepting position, thereby permitting advancement of said components.

7. The apparatus as recited in claim 6, wherein said leads are arranged in a polygonal array having at least three vertices, and wherein said fingers are disposed in separate planes to permit their simultaneous reciprocation across the face of said component.

8. The apparatus claimed in claim 7, wherein said guide means for advancing the components with generally similar orientation is sufficiently larger than said components to permit said intercept finger to rotate said component to a more precise orientation for the spreading of said leads.

9. The apparatus claimed in claim 6, wherein said means for normally locating the intercept finger in a lead intercepting relationship comprises a three-position air cylinder having one stable lead intercepting position.

10. The apparatus claimed in claim 6, further comprising escapement means disposed along said path for restraining advancement of said components during withdrawal of said spreading fingers.

11. The apparatus claimed in claim 10, wherein said escapement means comprises an air operated bladder disposed along said path adjacent the next electrical component following the component being operated upon by said fingers; and means for pressurizing said bladder during retraction of said fingers and clamping said component against said guiding means.